(12) United States Patent
Stavropoulos

(10) Patent No.: US 11,632,597 B2
(45) Date of Patent: *Apr. 18, 2023

(54) RESPONDING TO EMERGENCY-ALERT AUDIO TONE BY ABANDONING DYNAMIC CONTENT MODIFICATION

(71) Applicant: Roku, Inc., San Jose, CA (US)

(72) Inventor: John S. Stavropoulos, Edison, NJ (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,182

(22) Filed: Jul. 22, 2020

(65) Prior Publication Data
US 2022/0030324 A1   Jan. 27, 2022

(51) Int. Cl.
| H04N 21/81 | (2011.01) |
| --- | --- |
| H04N 21/44 | (2011.01) |
| H04N 21/234 | (2011.01) |
| H04L 65/612 | (2022.01) |

(52) U.S. Cl.
CPC ........ *H04N 21/814* (2013.01); *H04L 65/612* (2022.05); *H04N 21/23424* (2013.01); *H04N 21/44016* (2013.01); *H04N 21/812* (2013.01)

(58) Field of Classification Search
CPC .......... H04N 21/814; H04N 21/44016; H04N 21/23424; H04N 21/812; H04N 21/4084
See application file for complete search history.

(56) References Cited

U.S. PATENT DOCUMENTS

| 3,993,955 | A | * | 11/1976 | Belcher | ..................... | H04N 7/10 |
| | | | | | | 455/526 |
| 6,298,218 | B1 | * | 10/2001 | Lowe | ..................... | H04B 1/08 |
| | | | | | | 455/66.1 |
| 10,419,806 | B1 | * | 9/2019 | Nijim | .................. | H04N 21/4335 |

(Continued)

OTHER PUBLICATIONS

International Search Report and Written Opinion from International Application No. PCT/US2020/044762, dated Nov. 13, 2020.

(Continued)

*Primary Examiner* — Jefferey F Harold
*Assistant Examiner* — Timothy R Newlin
(74) *Attorney, Agent, or Firm* — Sterne, Kessler, Goldstein & Fox P.L.L.C.

(57) ABSTRACT

A method and system for controlling dynamic content modification such as dynamic advertisement insertion. An example method includes detecting presence of an emergency-alert audio tone in a media stream accessible to a media client, and responsively causing the media client to abandon a dynamic content modification, such as to forgo a planned dynamic content modification or to discontinue an in-progress dynamic content modification. This method could occur while the media client is processing a given media stream for presentation, and the method could include detecting presence of the emergency-alert audio tone in the given media stream or alternatively in another media stream accessible to the media client. And in the latter case, the method could further involve causing the media client to switch from processing the given media stream for presentation to instead processing the other media stream for presentation, which could facilitate presenting of an associated emergency alert.

17 Claims, 6 Drawing Sheets

(56) References Cited

U.S. PATENT DOCUMENTS

| | | | |
|---|---|---|---|
| 11,006,191 B2 | 5/2021 | Stavropoulos | |
| 11,343,593 B2 | 5/2022 | Stavropoulos | |
| 2003/0093788 A1* | 5/2003 | Takenaka | H04N 21/4394 725/33 |
| 2006/0005219 A1* | 1/2006 | Owens | H04N 21/4436 725/33 |
| 2008/0250453 A1* | 10/2008 | Smith | G06Q 30/0273 725/39 |
| 2010/0088697 A1* | 4/2010 | Clardy | H04L 12/2834 718/1 |
| 2010/0211972 A1* | 8/2010 | Howarter | H04H 20/106 725/33 |
| 2014/0086563 A1* | 3/2014 | Cole | H04N 21/4882 386/326 |
| 2014/0181243 A1 | 6/2014 | Nieuwenhuys | |
| 2014/0196071 A1 | 7/2014 | Terpstra et al. | |
| 2014/0282703 A1* | 9/2014 | Garg | H04N 21/814 725/33 |
| 2016/0182973 A1 | 6/2016 | Winograd et al. | |
| 2017/0070789 A1* | 3/2017 | Liassides | G06Q 30/0277 |
| 2017/0134466 A1* | 5/2017 | Giladi | H04N 21/26258 |
| 2017/0311049 A1 | 10/2017 | Kwak et al. | |
| 2018/0035174 A1 | 2/2018 | Littlejohn | |
| 2018/0242052 A1* | 8/2018 | Ng | H04N 21/435 |
| 2018/0376156 A1* | 12/2018 | Deshpande | H04N 21/2353 |
| 2019/0007712 A1 | 1/2019 | Venkatraman et al. | |
| 2019/0174204 A1 | 6/2019 | Deshpande | |
| 2019/0313134 A1* | 10/2019 | Fahnestock | H04N 21/2665 |
| 2019/0356965 A1 | 11/2019 | Winograd et al. | |
| 2019/0379945 A1 | 12/2019 | Rivera | |
| 2021/0037294 A1* | 2/2021 | Stavropoulos | H04N 21/814 |
| 2022/0232296 A1 | 7/2022 | Stavropoulos | |

OTHER PUBLICATIONS

Office Action from U.S. Appl. No. 15/929,212, dated Sep. 28, 2020.
International Preliminary Report on Patentability from International Application No. PCT/US2020/044762, dated Feb. 8, 2022, 8 pages.
Office Action in U.S. Appl. No. 17/301,705, dated Dec. 9, 2021.
Office Action in U.S. Appl. No. 17/658,401, dated Sep. 15, 2022.

* cited by examiner

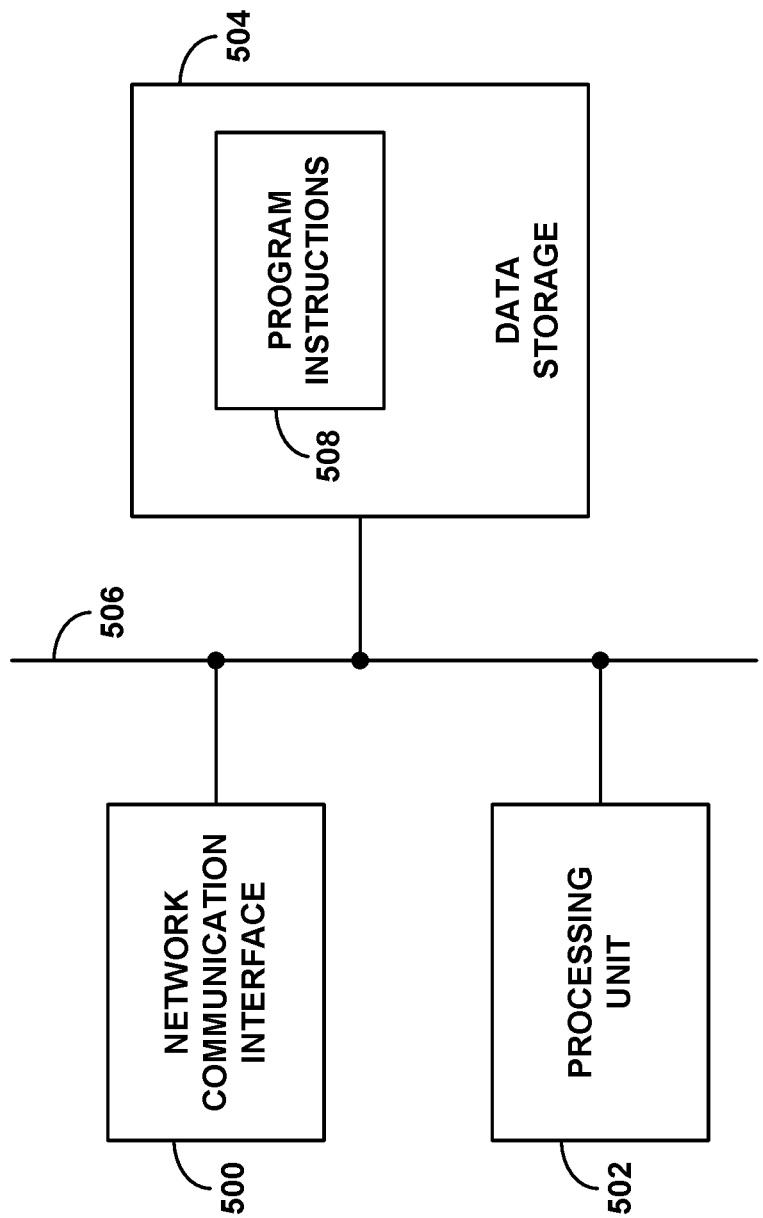

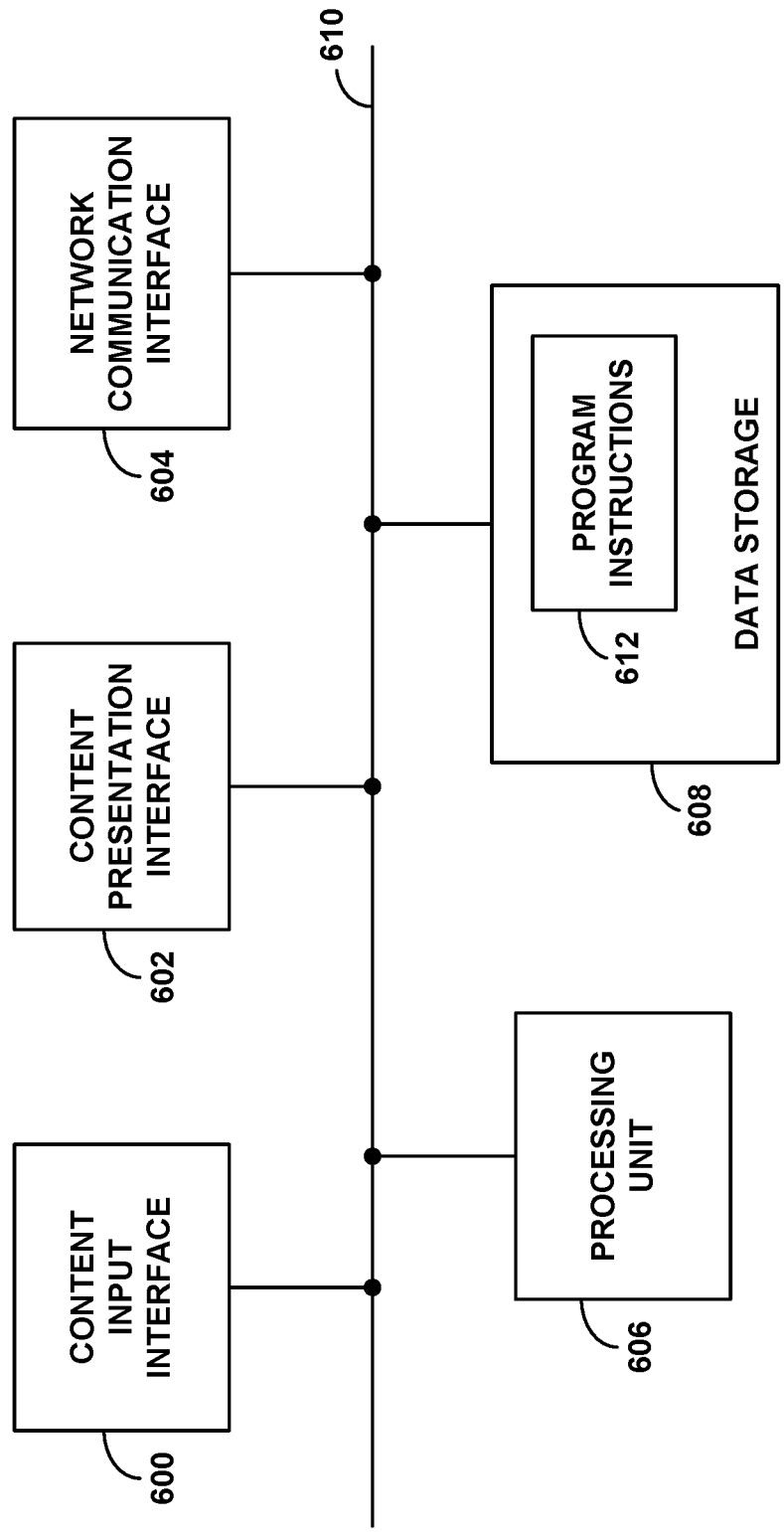

RESPONDING TO EMERGENCY-ALERT AUDIO TONE BY ABANDONING DYNAMIC CONTENT MODIFICATION

INCORPORATION BY REFERENCE

The following applications are incorporated by reference herein in their entirety: U.S. patent application Ser. No. 15/929,212, filed Jan. 29, 2020; and U.S. Provisional Patent Application No. 62/882,220, filed Aug. 2, 2019.

BACKGROUND

A typical media client operates to receive an analog or digital media stream representing media content such as video and/or audio content and to process the media stream for presentation on a user interface such as a display screen and/or an audio speaker. Examples of such clients include televisions, computer monitors, projection systems, loudspeakers, headphones, set top boxes (e.g. cable or satellite TV receivers), digital video recorders, radios, personal computers, mobile communication devices, gaming consoles, streaming media players, and the like. And the processing of the media stream for presentation could take various forms, examples of which include, without limitation, transcoding or otherwise manipulating content of the media stream to put the content in a form suitable to facilitate presentation, and outputting content of the media stream to a user interface and/or to another device for presentation.

By way of example, a television could receive a broadcast stream (e.g., over the air, from a set top box, through an Internet connection, or in another manner) and could engage in video and/or audio processing to present the media content of that broadcast stream on a display screen of the television. As another example, a set top box could receive a packetized transport stream carrying media content of a television channel provided by a multi-channel video program distributor (MVPD) and could de-packetize and output the media content of that stream via a High-Definition Multimedia Interface (HDMI) cable or other interface to a television and/or audio/video receiver for playout.

As still another example, a digital video or audio recorder could likewise receive a broadcast stream and could store the broadcast stream for later playout. As yet another example, a media player, computer, or other device could receive a media stream from a media streaming service and could transcode and output the media stream to a television or other display for presentation to a user. And as yet another example, a loudspeaker or headphones could receive a broadcast audio stream from a radio, computer, or other device, and could transcode and present the audio content of that stream to a user. Numerous other examples are possible as well.

SUMMARY

As a media client receives and processes a media stream for presentation to a user, it may be useful in certain situations for the media client to take special action with respect to the media stream. Without limitation, for instance, it may be useful for the media client to revise a portion of the stream's media content, such as to dynamically replace an ad or other segment of the media content with a replacement ad or with other replacement content, or to dynamically supplement a portion of the media content with overlay or split-screen content, such as channel identification, context information, ad content, interactive content, or the like.

Further, it may be desirable for the media client to perform such content revision at a specific time point within the media stream. For instance, if the media client is to dynamically replace an existing ad with a replacement ad, it may be desirable for the media client to position the replacement ad at a particular time in the media stream when the existing ad would have started. Likewise, if the client is to supplement a specific portion of the media content with an overlay possibly related to that portion, it may be desirable for the client to start the overlay when that portion starts. Other examples are possible as well.

More particularly, the media stream at issue could define a sequence of frames, such as video frames and/or audio frames, and it may be desirable for the media client to perform the content revision on a frame-accurate basis. For instance, for dynamic advertisement insertion (DAI), it may be desirable for the media client to insert a replacement ad in place of an existing ad starting precisely at the first frame of the existing ad. And for adding an overlay to a specific portion of the media stream, it may be desirable for the media client to start the overlay at or in specific time relation to the first frame of that portion of the media stream.

To facilitate having the media client take this or other such action at a desired time point within the media stream that the media client is receiving and processing for presentation, a server or other entity (hereafter "server") external to the media client could engage in signaling with the media client, providing the media client with a directive for the media client to take the action, and specifying the time point when the media client is to take the action ("action time point"). The media client could then take the action at the specified time point.

By way of example, the server could first determine the media stream (e.g., channel of content) that the media client is receiving for presentation. And as that determined media stream is en route to the media client, the server could then evaluate the en-route media stream to detect presence of a content-modification opportunity in the media stream and to determine a time point of that detected content-modification opportunity in the media stream. Having determined the time point of the detected content-modification opportunity in the media stream that is en route to the media client, the server could then provide the media client with advanced notice of that coming time point, i.e., informing the media client of the upcoming time point in the media stream before that time point in the media stream reaches the media client to be processed for presentation. That way, the media client could then prepare to carry out the content modification at the indicated time point and could accordingly carry out the content modification at the indicated time point.

This example process could take advantage of a time delay that is likely to exist from the point in time when a content distribution system outputs or otherwise processes any given media content (e.g., frame) of the media stream to be transmitted to the media client to the point in time when the media client receives or otherwise processes that media content for presentation. Depending on the configuration of the system, this delay could be on the order of 5-10 seconds.

Given this delay, it could be possible for the server to detect the presence of a content-modification opportunity in the media stream en route to the media client well enough before that portion of the media stream arrives at the media client for processing. By engaging in relatively quick out-of-band (e.g., Internet Protocol (IP) based) communication with the media client device during that delay period, the server could therefore prepare the media client to engage in content modification at the time of the content-modification opportunity, so that when that point in the media steam arrives at the media client for processing, the media client could then carry out the content modification in a timely manner.

One technical problem that can arise in this or another system where a media client dynamically modifies content of a media stream that the media client is receiving for presentation is that, once a decision has been made to apply the content modification, an event may occur that justifies abandoning the content modification—e.g., having the media client avoid or discontinue the content modification. One such event could be the occurrence of emergency alert (such as a weather alert or other public safety alert) in the media stream or, for that matter, in another media stream accessible to the media client. When such an emergency alert occurs, it may be best for the media client to abandon the content modification so as to facilitate presentation of the emergency alert.

The present disclosure provides a mechanism to help achieve this.

The disclosed mechanism leverages the fact that a typical emergency alert provided on a TV channel or linear media stream starts with (e.g., starts or is prefaced with) a human-perceptible emergency-alert audio tone indicative of the emergency alert. For example, in accordance with the Emergency Alert System (EAS), an emergency alert could be prefaced by an attention tone lasting between 8 and 25 seconds, such as a 1050 Hz tone or a two-tone attention signal of 853 Hz and 960 Hz sine waves, among other possibilities.

In accordance with the present disclosure, a computing system could monitor the media stream that a media client is receiving, to detect in the media stream the presence of this or another such an emergency-alert audio tone. For example, the computing system could analyze the media content of the stream in the analog or digital domain to detect at least one predefined audio waveform representative of the emergency-alert audio tone. Upon detecting in the media stream the presence of the emergency-alert audio tone, the computing system could then responsively cause the media client to abandon the dynamic content modification, so as to facilitate presentation of the underlying media content including the emergency alert without the content modification.

Alternatively, as the media client is receiving and processing a given media stream for presentation, the computing system could likewise monitor one or more other media streams that are accessible to the media client, to detect in another such media stream the presence of an emergency-alert audio tone. For instance, as the media client is receiving and processing for presentation a national broadcast or streaming media channel, the computing system could monitor a separate local broadcast affiliate channel (e.g., an ABC, NBC, CBS, or FOX affiliate) that is also accessible to the media client, to detect in that other channel the presence of an emergency-alert audio tone. And upon detecting the emergency-alert audio tone in that other media stream, the computing system could responsively cause the media client to abandon the dynamic content modification and switch to processing for presentation the other media stream instead, so as to present the emergency alert.

In an example implementation, this process could be carried out by the media client itself. For instance, once the media client has learned of an upcoming content-modification opportunity in the media stream that the media client is receiving and processing for presentation, the media client could start to monitor for the presence of an emergency-alert audio tone in the media stream that the media client is processing for presentation and/or in one or more other media streams accessible to the media client. And upon detecting presence of the emergency-alert audio tone, the media client could responsively abandon the content modification, by not starting the content modification or by discontinuing the content modification if already started. Further, if the media client detects the emergency-alert audio tone in a media stream other than the one that it is processing for presentation, the media client could responsively switch to provide that other media stream for presentation instead.

Alternatively, in another example implementation, the process could be carried out by an entity involved in delivery of the media stream to the media client, optimally an entity that detects or learns what media stream the media client is processing for presentation and/or what other media stream(s) may be also available to the media client. For example, if the media client is a television receiving and processing a channel of content from a set top box and/or from an MVPD, the set top box and/or MVPD could carry out the process. Or if the media client is a set top box receiving and processing a channel of content from an MVPD, the MVPD could carry out the process. And still further, if the media client is a streaming-media receiver such as an APPLE TV, ROKU, AMAZON FIRE, or CHROMECAST device, or a computer or other device, in network communication with a streaming-media server such as virtual-MVPD that distributes various channels of content, the streaming-media server could carry out the process.

By way of example, if the media client is receiving and processing a channel of content from an MVPD, the MVPD could monitor for the presence of an emergency-alert audio tone on that channel and/or on one or more other channels available to the media client. And upon detecting presence of the emergency-alert audio tone, the MVPD could then signal to the media client to cause the media client to abandon any upcoming or in-progress dynamic content modification. For instance, the MVPD could insert into the media stream en route to the media client a watermark or other coding to which the media client would respond abandoning the dynamic content modification. Further, if the MVPD detects the emergency-alert audio tone on a channel other than the one that the media client is processing for presentation, the signal from the MVPD to the media client could also cause the media client to switch to process that other channel for presentation instead.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 5 is a simplified block diagram of an example system that could operate in accordance with the disclosure.

FIG. 6 is a simplified block diagram of an example media client that could operate in accordance with the disclosure.

DETAILED DESCRIPTION

The present disclosure will discuss example implementation in connection with a media client comprising a content presentation device such as a television, loudspeaker, or the like. It will be understood, however, that various principles disclosed could extend to apply with respect to other types of media clients, such as set top boxes or other receivers, mobile phones, and the like, and/or media clients that are combinations of these or other entities, such as a set top box in combination with a television, among other possibilities.

Further, it will be understood that various arrangements and processes described herein can take various other forms. For instance, elements and operations can be re-ordered, distributed, replicated, combined, omitted, added, or otherwise modified. And it will be understood that functions described herein as being carried out by one or more entities could be implemented by and/or on behalf of those entities, through hardware, firmware, and/or software, such as by one or more processing units executing program instructions or the like.

Figure 1:
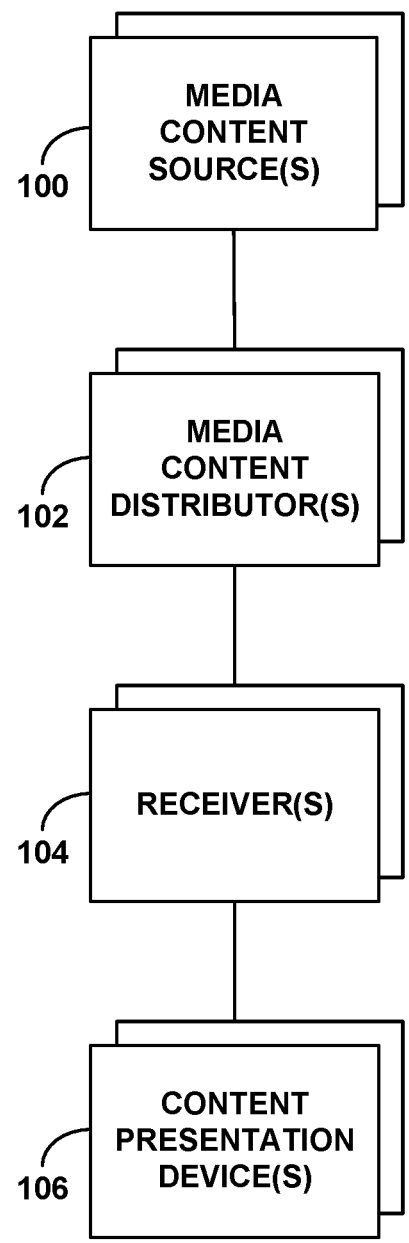
FIG. 1 is a simplified block diagram of an example system in which various disclosed principles can be applied.

Referring to the drawings, as noted above, FIG. 1 is a simplified block diagram of an example system in which various disclosed principles can be applied. As shown in FIG. 1, the example system includes one or more media content sources 100 (e.g., broadcasters, web servers, etc.), one or more media content distributors 102 (e.g., multichannel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, for instance, the media content sources 100 could be national broadcasters, such as those noted above, the media content distributors 102 could be local affiliates and/or other local content distributors, possibly for specific DMAs, and the receivers 104 and content presentation devices 106 could then be situated at customer premises, such as homes or business establishments.

With this or other arrangements, the content sources 100 could deliver media content to the content distributors 102 for distribution to receivers 104 at customer premises, and the content distributors could distribute the media content to the receivers 104 as particular channels of content (e.g., particular frequencies, particular streaming media sessions, or other defined channels). Each receiver 104 could then respond to user input or one or more other triggers by tuning to or otherwise starting to receive a selected channel and outputting to one or more content presentation devices 106 a media stream representing media content of the selected channel. And each content presentation device 106 could thus receive and render the media content (e.g., display or otherwise present the content).

Without limitation, for instance, each content presentation device 106 could be a television situated at customer premises, which could be coupled by an HDMI cable with a cable-TV set top box, and the set top box could be coupled through a local distribution network with a cable-TV head end that distributes various television channels provided by national and/or local broadcasters. In this arrangement, the television could regularly receive a media stream via HDMI from the set top box, and the set top box could tune to a particular channel from the head end in response to user input, so that the media stream arriving at the television would then represent the user-selected channel. Other examples are possible as well.

Figure 2:
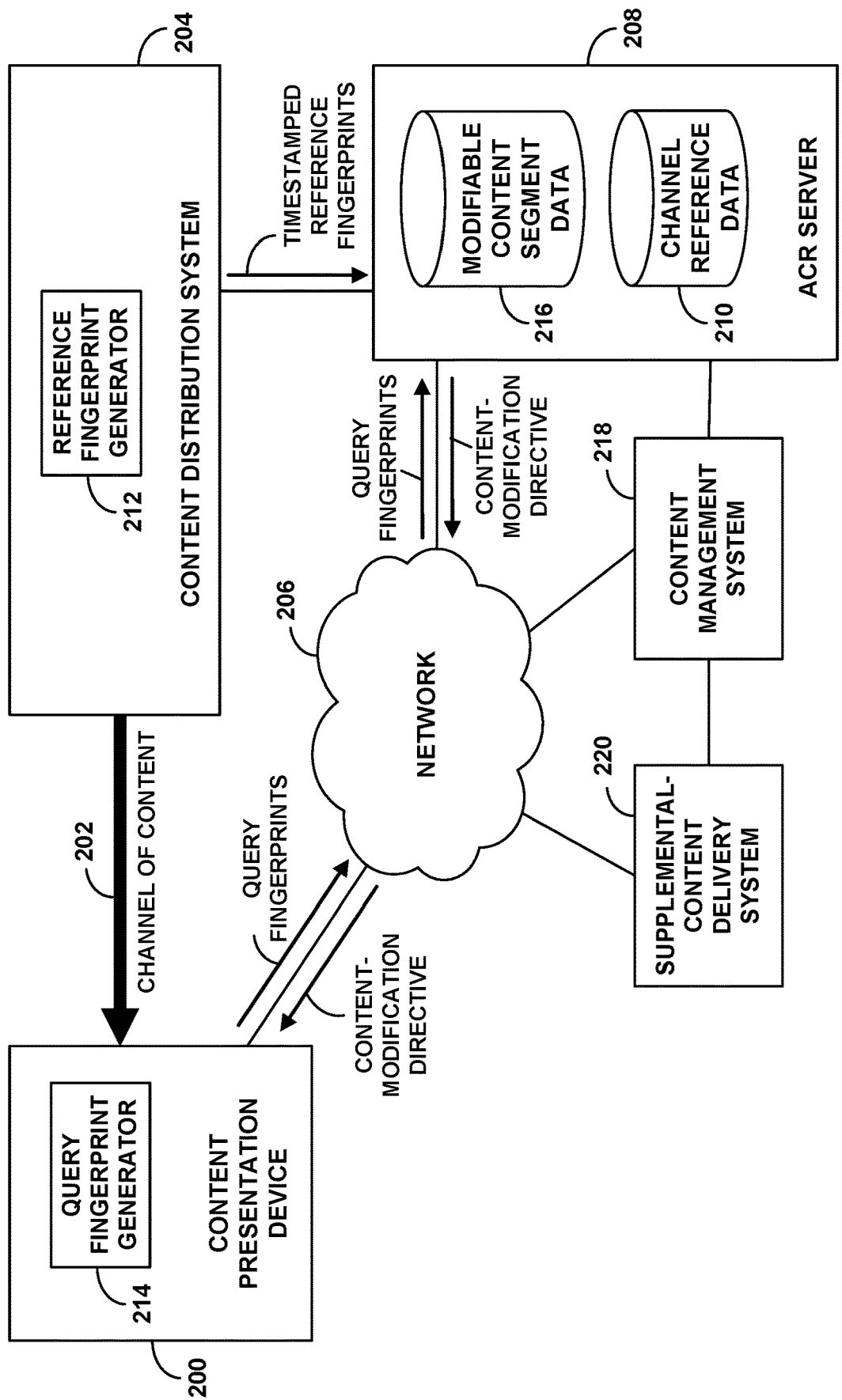
FIG. 2 is another simplified block diagram of an example system in which various disclosed principles can be applied.

FIG. 2 next illustrates more specifically an example system in which some of the presently disclosed features could be implemented.

FIG. 2 shows at its top a representative content presentation device 200 receiving a channel of content 202 being provided by a content distribution system 204. By way of example, the content presentation device 200 could be an example content presentation device 106 as shown in FIG. 1, and the content distribution system 204 could comprise any system that outputs, delivers, or otherwise provides media content, perhaps as a representative media content source 100 and/or media content distributor 102 of FIG. 1, among other possibilities.

As such, the content presentation device 200 could be receiving and rendering the channel of content 202 in a media stream directly or indirectly from the content distribution system 204. The channel might be a linear broadcast feed and/or might be a streaming media channel, and the content presentation device might be receiving the channel through any of a variety of distribution channels, such as but not limited to cable, satellite, terrestrial over-the-air broadcast, or others now known or later developed.

In an example implementation, the media content of the channel could define a sequence of digital frames of media content that the media client is configured to render for presentation to a user. For instance, a media content source, media content distributor, and/or other entity might be broadcasting, streaming, or otherwise providing this sequence of frames encapsulated in a transport stream for receipt by a receiver (e.g., that is currently set to receive the channel of content), and the receiver may be extracting the sequence of frames from the transport stream and outputting the sequence of frames as the media stream for receipt and rendering by the media client.

As further shown in FIG. 2, the content presentation device 200 is interconnected with a communication network 206, which could be a packet-switched network such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the media stream representing the channel of content 202 provided by the content distribution system 204.

Shown accessible via the network 206 (e.g., at a defined IP address on the network) is an automatic content recognition (ACR) server 208, which could operate to identify the channel of content being rendered by the content presentation device 200 and to coordinate having the content presentation device engage in channel-specific action, such as dynamic content modification of content included on the identified channel.

In practice, the ACR server 208 could determine in various ways the channel of content being rendered by the content presentation device 200. As one example, if the content presentation device 200 has information that identifies the channel of content being rendered, the content presentation device 200 might transmit to the ACR server 208 a message that specifies the channel being rendered. Alternatively, the ACR server 208 and content presentation device 200 could cooperatively engage in fingerprint-based ACR to identify the channel.

With fingerprint-based ACR, the ACR server 208 could be provisioned with reference data that includes digital reference fingerprints respectively representing each of various known channels of media content (e.g., each of the channels within a subscription plan for a set-top box that supplies media content to the content presentation device) and that maps the reference fingerprints to the respective channels that they represent. Further, the ACR server 208 could receive digital query fingerprints that represent the media content currently being rendered by the content presentation device 200, and the ACR server 208 could compare the query fingerprints with the reference fingerprints in an effort to find a match. Upon finding that the query fingerprints match the reference fingerprints mapped to a particular channel, the ACR server 208 could thus determine that the channel being rendered by the content presentation device is that particular channel.

In an example implementation of fingerprint-based ACR, the content distribution system 204 that distributes each of one or more known channels of media content to content presentation devices could regularly provision the ACR server 208 with reference data 210 to enable the ACR server 208 to conduct the fingerprint analysis.

In particular, for each of one or more channels that the content distribution system 204 is distributing, the content distribution system 204 could apply a reference-fingerprint generator 212 (e.g., program instructions executable by a processor of the content distribution system 204) to generate reference fingerprints on a per-frame basis or other ongoing basis, and the content distribution system 204 could establish for each such reference fingerprint an associated reference timestamp indicating the time at which the content distribution system 204 processed the frame. Further, the content distribution system 204 could regularly transmit to the ACR server 208 the reference fingerprints, specifying for each reference fingerprint the associated reference timestamp, the channel whose frame the reference fingerprint represents, and an identity of the content distribution system 204.

Without limitation, an example digital fingerprinting process as to video content could apply on a per video frame basis and could involve establishing a representation of luminosity and/or other video characteristics. For instance, for a given video frame, the fingerprint generator 212 could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator 212 could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination, or series of such bit strings or other representative values defining a digital fingerprint, on a sliding window basis. Other digital fingerprinting processes could be used as well.

The ACR server 208 could thus regularly receive from the content distribution system 204 the reference data including these reference fingerprints, each being tagged or otherwise associated with information that maps the reference fingerprint to the channel whose frame the reference fingerprint represents, and each being tagged or otherwise associated with an associated reference timestamp defining server time of the underlying frame of content. And as the ACR server 208 receives this reference data, the ACR server 208 could store the reference data in a relational database or other form suitable for ready searching and access.

In addition, as the content presentation device 200 receives and renders a media stream representing a given channel of media content 202, the content presentation device could generate the query fingerprints of the media content on a pre-frame basis or other ongoing basis and could regularly transmit the generated query fingerprints to the ACR server 208 for analysis.

To facilitate this, the content presentation device 200 in an example implementation could be equipped with a fingerprint generator 214 (e.g., program instructions executable by a processor of the content presentation device 200), configured to generate query fingerprints representing the media content of the channel 202 that the content presentation device 200 is currently rendering. The fingerprint generator 214 could be configured to receive as input a copy of the media content of the channel as the media content arrives at the content presentation device 200 and/or is processed for presentation by the content presentation device 200, and the fingerprint generator 214 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could transmit its generated query fingerprints via network 206 to the ACR server 208 for analysis, to enable the ACR server 208 to engage in fingerprint-based ACR and coordination of associated channel-specific action. By way of example, the content presentation device 200 could periodically or otherwise from time to time transmit to the ACR server 208 the query fingerprints representing a latest series of frames of the channel being rendered by the content presentation device 200. For instance, the content presentation device 200 could generate a message carrying the latest generated query fingerprints and could transmit the generated message to the IP address of the ACR server 208 for analysis.

Given the query fingerprints representing media content of the channel 202 being rendered by the content presentation device 200, and given the reference data including reference fingerprints respectively representing each of various known channels, the ACR server 208 could engage in fingerprint-based ACR processing. For instance, on an ongoing basis or in response to one or more trigger events, the ACR server 208 could compare the query fingerprints provided by the content presentation device 200 with the reference fingerprints provided by the content distribution system 204.

To compare a given query fingerprint with a given reference fingerprint, the ACR server 208 could compare corresponding portions of the fingerprints with each other to determine whether the portions match exactly or within defined tolerances. For example, the ACR server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of a particular channel, the ACR server 208 could then conclude that that is the channel being rendered by the content presentation device 200.

In a representative implementation, once the ACR server 208 has determined, through fingerprint-based ACR or any in any other manner, the channel that the content presentation device is rendering, the ACR server 208 or another entity could then engage in a process to facilitate dynamic content modification, such as targeted advertisement replacement. Thus, the dynamic content modification could be responsive to the fingerprint-based ACR.

By way of example, once the ACR server 208 has determined the channel that the content presentation device is rendering, the ACR server 208 could then use that determined channel identity as a basis to detect when a content-modification opportunity is about to occur on that particular channel. And the ACR server 208 or other entity could then responsively cause the content presentation device to carry out a content modification at the time of the content-modification opportunity.

In line with the discussion above, this example channel-specific action could take advantage of the time delay that is likely to exist from the point in time when the content distribution system 204 outputs media content of the channel for transmission to the content presentation device 200 to the point in time when the content presentation device 200 receives and/or renders that media content. As noted above, this delay might be on the order of 5-10 seconds.

Given that delay, it may be possible for the content distribution system 204, the ACR server 208, and/or one or more other entities to detect the presence of particular content defining a content-modification opportunity on the channel that is en route to (e.g., about to be or being distributed to) the content presentation device 200 well enough before that content arrives at the content presentation device 200. Namely, as discussed above, by engaging in relatively quick out-of-band (e.g., IP-based) communication with the content presentation device 200 during that delay period, the ACR server 208 could then prepare the content presentation device 200 to engage in content modification with respect to the detected content, so that when the detected content ultimately arrives at the content presentation device 200 and/or is ready for presentation by the content presentation device 200, the content presentation device 200 could carry out the content modification in a timely manner.

As to content modification, for instance, the ACR server 208 could be provisioned in advance with modifiable-content segment data 216 that includes digital fingerprints respectively representing each of various modifiable-content segments of media content, along with associated metadata per modifiable-content segment, such as a duration of the segment, an identifier of the segment, a type of associated content modification (e.g., replacement or overlay) and the like. For instance, a content management system 218 could generate and provide this information in advance to the ACR server.

Having identified the channel being rendered by the content presentation device, the ACR server 208 could then compare the ongoing sequence of reference fingerprints representing that identified channel with the fingerprints representing the various modifiable-content segments. And upon finding with sufficient certainty that the reference fingerprints of the identified channel match the fingerprints representing a particular modifiable-content segment, the ACR server 208 could reasonably conclude that the channel of media content en route to the content presentation device includes that modifiable-content segment. Further, the ACR server could thereby determine from the reference data 210 of the identified channel the reference timestamp indicating when the modifiable content segment is present on the channel.

Upon so detecting the presence of a modifiable-content segment in the media content of the channel that is en route to the content presentation device 200, the ACR server 208 could then responsively engage in out-of-band signaling with the content presentation device 200 to enable, cause, and prepare the content presentation device 200 to perform a content modification with respect to that particular modifiable-content segment. Namely, the ACR server 208 could transmit to the content presentation device 200 a content-modification directive, directing the content presentation device 200 to carry out the content modification.

In this directive, the ACR server 208 could provide the content presentation device 200 with timing information regarding the upcoming content modification opportunity. This timing information regarding the upcoming content modification opportunity could include the reference timestamp that the reference data 210 indicates for the reference fingerprint representing the first frame of the modifiable-content segment. With this timing information, the content presentation device 200 could accordingly plan to carry out a content modification at the indicted action time point as the content presentation device 200 processes the channel of content for presentation.

Further, the ACR server 208 could provide the content presentation device 200 with various other information regarding the modifiable content segment, to enable the content presentation device to carry out the content modification at the indicated time of the modifiable-content segment. For instance, the ACR server 208 could provide the content presentation device 200 with metadata as described above, such as a duration of the segment, an identifier of the segment, and a type of associated content modification (e.g., replacement or overlay) and the like.

With this or other such information, the content presentation device 200 could then responsively work with the content management system 218 and/or another entity to obtain details of the content modification to perform with respect to the upcoming modifiable-content segment. For instance, the content presentation device 200 could transmit to the content management system 218 a request that provides the content management system 218 with the modifiable-content segment identifier and other associated metadata about the modifiable content segment. And the content management system 218 could responsively provide the content presentation device 200 with information to facilitate the content modification.

The content management system 218 could use various information as a basis to determine supplemental content that the content presentation device 200 should render in place of or as an overlay superimposed on the modifiable-content segment. For instance, the content management system 218 could use user-demographics, location, and/or other information regarding the content presentation device 200 as a basis to determine appropriate supplemental content.

Further, the content management system 218 could ascertain a storage location of determined supplemental content and could provide the content presentation device 200 with an indication of that storage location. For instance, the content management system 218 could query a supplemental-content delivery system 220 to determine a uniform resource locator (URL) or other address from which the content presentation 200 device could obtain the supplemental content from a network server or from local data storage of the content presentation device 200. And the content management system 218 could provide the content presentation device 200 with that address and/or with other information to enable the content presentation device 200 to obtain the supplemental content. Alternatively, the content management system 218 itself or another entity could provide the content presentation device 200 with the supplemental content.

With this information, the content presentation device 200 could thus obtain the supplemental content and could plan to present the supplemental content (e.g., as replacement or overlay) at the time of the modifiable-content segment on the channel that the content presentation device 200 is rendering.

The example content-modification process described so far could be carried out for various purposes. Without limitation, for instance, the content-modification process could be carried out to facilitate DAI, such as where the content presentation device replaces a generally applicable ad (e.g., a nationally broadcast ad) with a replacement ad possibly selected based on location, user demographics, and/or other information specific to the content presentation device.

For DAI, an entity such as content broadcaster, distributor, or ad-replacement service might enter into agreements with advertisers to facilitate replacing playout of certain ads, deemed "replaceable ads," with different ads, deemed "replacement ads." For each of various replaceable ads, the content management system 218 or other entity could then receive a copy of the replaceable ad and could provision the ACR server 208 with digital fingerprints representing the replaceable ad and with associated data regarding the replaceable ad. For instance, for each replaceable ad, the content management system 218 could generate digital fingerprints of the replaceable ad on a per-frame basis or the like and could transmit to the ACR server 208 the generated fingerprints of the replaceable ad along with metadata as described above, such as a unique identifier of the replaceable ad, a duration of the replaceable ad, an indication that the ad is to be replaced, and so forth. (Further, the data provided to the ACR server 208 could include a traffic schedule that indicates when specific ads, with particular identifiers and associated fingerprints, are scheduled to be presented on each of one or more channels.)

Once the ACR server 208 has identified the channel being rendered by the content presentation device 200, the ACR server 208 could then responsively compare the reference fingerprints representing that identified channel with the fingerprints representing various replaceable ads. And upon finding with sufficient certainty that the reference fingerprints of the identified channel match the fingerprints representing a particular replaceable ad, the ACR server 208 could reasonably conclude that the channel being rendered by the content presentation device 208 includes the replaceable ad, and more specifically that the media content en route to the content presentation device 208 includes that replaceable ad.

In response to this conclusion, the ACR server 208 and/or another entity could engage in signaling with the content presentation device 200 to prepare the content presentation device 200 to present a replacement ad in place of the replaceable ad. In line with the discussion above, for instance, the ACR server 208 or other entity could transmit to the content presentation device 200, through out-of-band signaling, one or more messages that provide the content presentation device 200 with (i) a reference timestamp as described above that indicates when the replaceable ad will occur on the channel that the content presentation device 200 is rendering, (ii) the unique identifier of the replaceable ad, and (iii) a duration of the replaceable ad.

Given the identifier and duration of the replaceable ad, the content presentation device 200 could then engage in out-of-band signaling with the content management system 218 to ascertain a replacement ad that the content presentation device should render in place of the replaceable ad. Here, the content presentation device 200 might provide the content management system 218 with a user identification, demographics, location, and/or other information that the content management system 218 could use as a basis to select an appropriate replacement ad. Further, the content management system 218 could use the duration of the replaceable ad, indicated by the content presentation device 200 or mapped to the ad-identifier of the replaceable ad for instance, to select a replacement ad that is of the same duration as the replaceable ad.

The content management system 218 could then work with the supplemental-content delivery system 220 to determine a URL or other address or location from which the content presentation device could obtain the replacement ad and could inform the content presentation device 200 accordingly. And the content presentation device 200 could thus obtain the replacement ad and plan to render it in place of the replaceable ad on the channel that the content presentation device 200 is rendering, as discussed above.

As noted above, the present disclosure provides for detecting an emergency-alert audio tone in a media stream and responsively causing a media client to abandon dynamic content modification. This mechanism could be applied with respect to any of a variety of dynamic content modification scenarios. Without limitation, for instance, the mechanism could be applied in connection with the above-described dynamic content modification process, such as with DAI.

Figure 3:
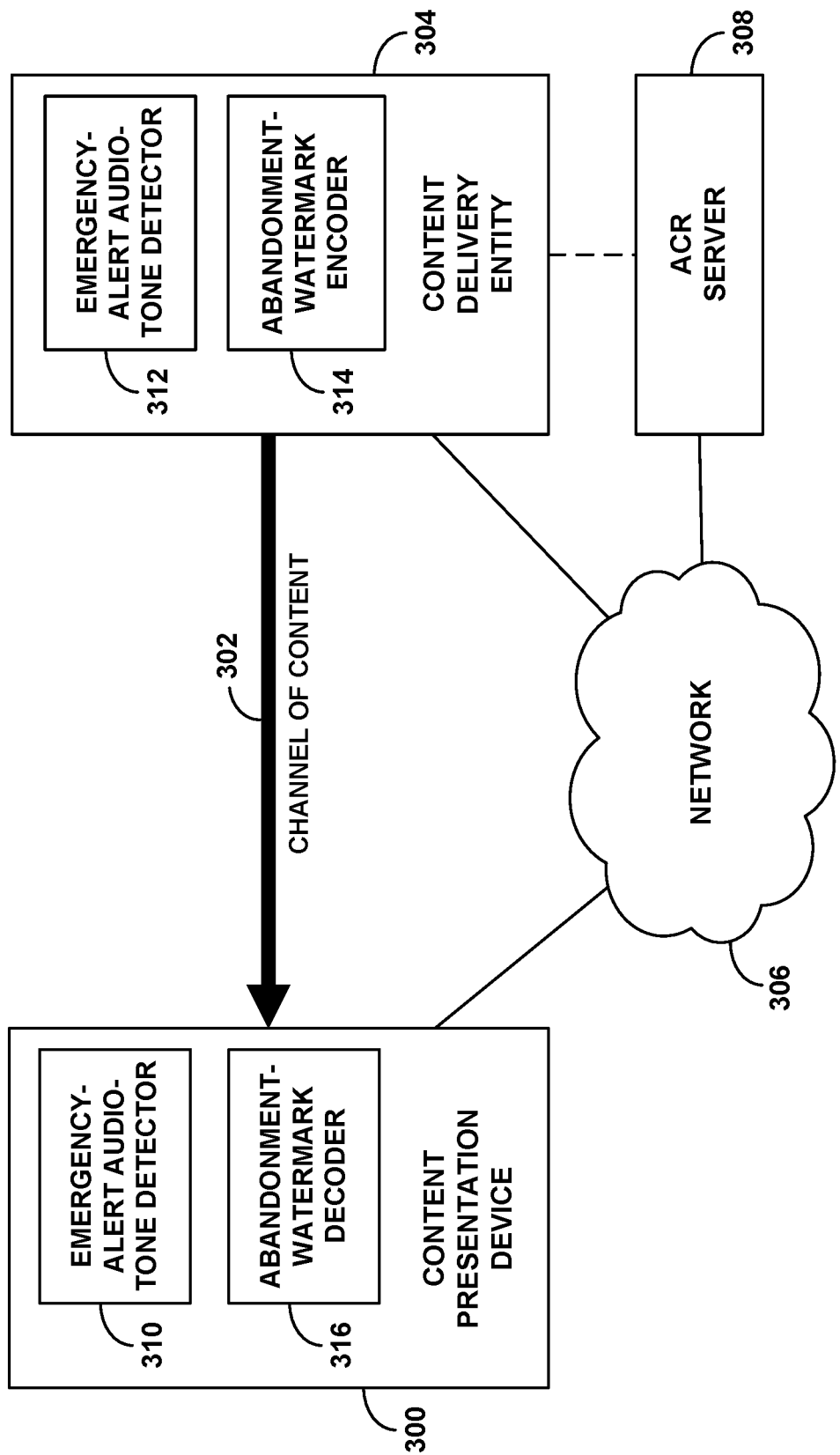
FIG. 3 is another simplified block diagram of an example system in which various disclosed principles can be applied.

FIG. 3 is a simplified block diagram illustrating components that could be involved in an example implementation. In particular, FIG. 3 illustrates a content presentation device 300, a content delivery entity 304, and an ACR server 308.

Here, the content presentation device 300 and the ACR server 308 could be examples of the content presentation device 200 and the ACR server 208 discussed above. For instance, the content presentation device 300 could be a television located at customer premises, and the ACR server 308 could be a network server configured to carry out fingerprint matching, content identification, and triggering of dynamic content modification as discussed above, and the content presentation device 300 and ACR server 308 could communicate with each other via a network 306 such as the Internet.

The content delivery entity 304 could then be any entity that is involved with delivery of a media stream representing a channel of content 302 directly or indirectly to the content presentation device 300. For instance, the content delivery entity 304 could be a source of the media stream and/or an entity that sits within a communication path through which the media stream passes en route to the content presentation device 300.

Without limitation, for example, the content delivery entity 304 could be set top box or other receiver that is locally connected with the content presentation device 300. As noted above, such an entity could be configured to selectively receive a user-selected channel of content from a content distributor such as a head end or virtual-MVPD and to deliver to the content presentation device 300 a media stream representing that channel of content. And as another example, the content delivery entity 304 could be a media content distributor such as an MVPD, which as noted above could provide a media stream representing a channel of content for delivery to a receiver serving the content presentation device 300. Other examples are possible as well.

FIG. 3 depicts a dashed line between the content delivery entity 304 and the ACR server 308, to represent that these components might be in communication with each other, as discussed above.

As further shown in FIG. 3, the content presentation device 300 could include an emergency-alert audio-tone detector 310 (e.g., program instructions executable by a processor of the content presentation device 300) for detecting an emergency-alert audio tone in a media stream being received by the content presentation device 300.

The emergency-alert audio-tone detector 310 could operate to analyze a media stream that the content presentation device 300 is receiving and processing for presentation, to detect in the media stream an emergency-alert audio tone indicative of the presence of an emergency alert in the media stream, and to output an associated signal.

The emergency-alert audio-tone detector 310 could conduct this analysis in the analog domain or in the digital domain, perhaps depending on the form of the media content and/or on the stage of processing of the media content by the content presentation device. And the emergency-alert audio-tone detector 310 could apply a Fourier transform and/or any of various of audio-tone detection mechanism now known or later developed, configured for present purposes to detect a predefined audio tone that would indicate the presence in the media stream of an emergency alert. For instance, if the audio tone would be an EAS alert tone such as a 1050 Hz waveform or dual 853 Hz and 960 Hz waveform, the emergency-alert audio-tone detector 310 could monitor the media stream for the presence of either such alert tone. Further, if the predefined alert tone would last for at least a predefined duration, the emergency-alert audio-tone detector 310 could monitor to determine whether the detected tone lasts for at least a similar predefined period.

In an example implementation, the content presentation device 300 could regularly apply the emergency-alert audio-tone detector 310 when the content presentation device 300 is processing a media stream for presentation. Alternatively, the content presentation device 300 could start applying the emergency-alert audio-tone detector 310 in response to the content presentation device 300 learning of an upcoming dynamic content modification, and the content presentation device 300 could stop applying the emergency-alert audio-tone detector 310 in response to finishing such a content modification.

In line with the discussion above, the content presentation device 300 could apply the emergency-alert audio-tone detector 310 to monitor the media stream that the content presentation device 300 is currently processing for presentation. If the emergency-alert audio-tone detector 310 thereby detects in that media stream an emergency alert audio tone, the content presentation device 300 could responsively abandon an upcoming or in-progress dynamic content modification.

This process could occur at any time in relation to the dynamic content modification. For instance, the process could occur between when the content presentation 300 device begins planning for a dynamic content modification (e.g., once it has received an initial directive to carry out the dynamic content modification) and when the content presentation device 300 would finish carrying out the dynamic content modification. And the content presentation device could respond to the detected emergency-alert audio tone by abandoning the dynamic content modification, such as by not carrying out a content modification that is being planned or by discontinuing a content modification that is occurring.

Considering the example dynamic content modification process described above, for instance, the emergency-alert audio-tone detector 310 might detect the presence of an emergency-alert audio tone between (i) the time when the content presentation device 300 receives from the ACR server 308 timing information and/or other information about an upcoming content modification opportunity and (ii) the time when the upcoming content modification opportunity would start. In that case, the content presentation device 300 could then respond to the detected emergency-alert audio tone by abandoning its plans to start the content modification and by thus not starting the content modification. For example, depending on where the content presentation device 300 is in the planning process before starting the content modification, the content presentation device 300 might thereby forgo further operations such as working with a content management system and/or other entity to obtain details of the content modification to perform, and/or obtaining supplemental content such as replacement or overlay content.

Alternatively, the emergency-alert audio-tone detector 310 might detect the presence of an emergency-alert audio tone while the content presentation device is currently rendering the content modification, such as while the content presentation device is rendering replacement or overlay content. To facilitate this, the emergency-alert audio-tone detector 310 would continue to monitor the underlying media stream being modified. And in this case, the content presentation device 300 could respond to the detected emergency-alert audio tone by discontinuing the content modification and thus reverting to rendering of the underlying media stream without completing the content modification.

Still alternatively, if the content presentation device 300 starts applying the emergency-alert audio-tone detector 310 before the content presentation device 300 begins planning for an upcoming dynamic content modification, and if the emergency-alert audio-tone detector 310 detects presence of an emergency-alert audio tone before the content presentation device 300 begins planning for an upcoming dynamic content modification, the content presentation device 300 could respond to the detected emergency-alert audio tone by setting itself to forgo carrying out any upcoming dynamic content modification until after the detected emergency alert ends. Here, for instance, a typical emergency alert might end with a predefined code or other indicia that the content presentation device 300 might detect as a trigger for then reverting to allow application of any dynamic content modification.

In an alternative implementation as discussed above, when the content presentation device is processing a given media stream for presentation, the content presentation device 300 could apply the emergency-alert audio-tone detector 310 to monitor one or more other media streams accessible to the content presentation device, in order to detect in such another media stream the presence of an emergency-alert audio tone. And if the emergency-alert audio-tone detector 310 thereby detects in such another media stream an emergency-alert audio tone, the content presentation device 300 could likewise responsively abandon an upcoming or in-progress dynamic content modification of the given media stream and could also responsively switch from processing for presentation the given media stream to instead processing for presentation the other media stream, so as to present the emergency alert.

Various features described above can be applied in this context as well. For instance, the content presentation device 300 could start applying the emergency-alert audio tone detector 310 with timing as noted above.

For this implementation, multiple media streams would be concurrently accessible to the content presentation device 300, so that the content presentation device 300 could be processing the given media stream for presentation while simultaneously monitoring at least one other media stream to detect in the other media stream the presence of an emergency-alert audio tone. This could be possible if the content presentation device 300 has multiple tuners and is able to tune to and receive multiple different channels at once, among other possibilities.

As one example implementation of this process, the one or more other media streams that the content presentation device 300 monitors could be media streams provided by broadcasters local to the content presentation device's region, such as local affiliate channels of national broadcasters. Such local broadcasts may be likely to carry emergency alerts pertinent to the content presentation device's region.

To facilitate this, the content presentation device 300 could be pre-provisioned with identification of one or more such local broadcast channels. Based on that provisioning, the content presentation device 300 could accordingly provide to the emergency-alert audio-tone detector for analysis the media stream of one or more such local broadcast channels.

For example, if the content presentation device 300 is currently processing for presentation a national broadcaster's channel, the content presentation device 300 could provide to the emergency-alert audio-tone detector for analysis the media stream of a local affiliate channel of that national broadcaster. Thus, the content presentation device 300 could include or have access to data that correlates each of various national broadcast channels with corresponding local affiliate channels. And based on the content presentation device 300 processing a given national broadcast channel for presentation, the content presentation device 300 can determine the associated local affiliate channel and therefore monitor that local affiliate channel for presence of an emergency-alert audio tone.

As noted above, in this implementation, the content presentation device 300 could respond to the emergency-alert audio tone being detected in the other media stream by not only abandoning a planned or in-progress dynamic content modification (in the manner discussed above for instance) in the given media stream but also switching to process the other media stream for presentation. In this implementation, the content presentation device 300 could then further detect an end of the emergency alert and could then responsively switch back to processing the given media stream for presentation.

As further noted above, in an alternative implementation, the process of detecting the emergency-alert audio tone in a media stream, to trigger responsive abandonment of dynamic content modification, could be carried out by an entity involved in delivery of the media stream to the content presentation device 300. In an example implementation as also illustrated in FIG. 3, this could be the content delivery entity 304, such as an MVPD for instance.

To facilitate this implementation, as shown in FIG. 3, the content delivery entity 304 could similarly include an emergency-alert audio-tone detector 312 (e.g., program instructions executable by a processor of the content delivery entity 300) for detecting an emergency-alert audio tone in a media stream being received by the content presentation device 300.

As with the emergency-alert audio-tone detector 310 discussed above, this emergency-alert audio-tone detector 312 could operate to analyze a media stream that the content presentation device 300 is receiving and processing for presentation, to detect in the media stream an emergency-alert audio tone indicative of the presence of an emergency alert in the media stream, and to output an associated signal.

To carry out this process, the content delivery entity 304 could detect or learn what media stream (e.g., what channel) the content presentation device 300 is currently processing for presentation. By way of example, if the content delivery entity 304 is a content distributor such as an MVPD, the content delivery entity 304 could learn from the ACR server 308 what media stream the content presentation device 300 is processing for presentation. For instance, if the ACR server 308 identifies the media stream that the content presentation device 300 is processing for presentation as discussed above, the ACR server 308 could responsively signal to the content delivery entity 304 to inform the content delivery entity 304 that the content presentation device 304 is presenting that media stream. In response to this information, the content delivery entity 304 could then start applying the emergency-alert audio-tone detector 312 to monitor for the presence of an emergency-alert audio tone in that media stream.

If the emergency-alert audio-tone detector 312 thereby detects presence of an emergency-alert audio tone in the media stream that the content presentation device is processing for presentation, the emergency-alert audio-tone detector 312 could responsively signal to the content presentation device 300 to cause the content presentation device to responsively abandon an upcoming or in-progress dynamic content modification.

The timing of this process could also be similar to that discussed above.

For instance, the content delivery entity 304 could, similarly, regularly apply the emergency-alert audio-tone detector 312 when the content presentation device 300 is processing a media stream for presentation. Or the content delivery entity 304 could start doing so in response to learning of an upcoming dynamic content modification in the media stream and could stop doing so at the end of the dynamic content modification.

To facilitate having the content delivery entity 304 start applying the emergency-alert audio-tone detector 312 in response to learning of the upcoming dynamic content modification, the content delivery entity 304 could learn from the ACR server 308 of the upcoming dynamic content modification. For instance, when the ACR server 308 informs the content presentation device 300 of an upcoming content-modification opportunity, the ACR server 308 could also inform the content delivery entity 304 of the upcoming content-modification opportunity. And in response, the content delivery entity 304 could then start applying the emergency-alert audio-tone detector 312 to monitor for presence of an emergency-alert audio tone in the media stream that the content presentation device is processing for presentation.

Further, the signaling from the content delivery entity 304 to the content presentation device could likewise cause the content presentation device 300 to not carry out a content modification that is planned or could likewise cause the content presentation device 300 to discontinue a content modification that is occurring, among other possibilities.

Consistent with the discussion above, in yet another implementation, while the content presentation device 300 is processing a given media stream for presentation, the content delivery entity 304 could apply the emergency-alert audio-tone detector 312 to monitor for the presence of an emergency-alert audio tone in one or more other media streams accessible to the content presentation device 300. And if the emergency-alert audio-tone detector 314 thereby detects in such another media stream an emergency-alert audio tone, the content delivery entity 304 could responsively signal to the content presentation device 300 to cause the content presentation device to responsively both (i) abandon an upcoming or in-progress dynamic content modification and (ii) switch from processing for presentation the given media stream to instead processing for presentation the other media stream, so as to present the emergency alert.

In this implementation, the content delivery entity 304 would have access to multiple media streams that are also accessible to the content presentation device, so that, when the content delivery entity 304 detects an emergency-alert audio tone in such another media stream and signals to the content presentation device 300, the content presentation device 300 could switch to presentation of the other media stream. An MVPD that serves the content presentation device, by way of example, may have access to those other media streams.

In various implementations where the content delivery entity 304 signals to the content presentation device 300 to cause the content presentation device to abandon a dynamic content modification and perhaps further to switch to processing another media stream for presentation, the content delivery entity 304 could signal to the content presentation device 300 in various ways.

As one example, the content delivery entity 304 could signal to the content presentation device 300 through out-of-band signaling over network 306. For instance, the content presentation device 300 might have a registered network address, such as a network access identifier, that the content delivery entity 304 could use as a basis to signal to the content presentation device 300 over the network 306.

The content delivery entity 304 could thereby transmit to the content presentation device 300 a message that carries a directive to which the content presentation device 300 would be configured to respond by taking the associated action(s). For instance, the content delivery entity 304 could transmit to the content presentation device 304 a message that causes the content presentation device 300 to abandon a dynamic content modification, and the message could further specify another media stream (e.g., channel), to cause the content presentation device 300 to switch to processing of that other media stream for presentation.

Alternatively, the content delivery entity 304 could signal to the content presentation device by conveying signaling within the media stream that the content presentation device is currently processing for presentation. For instance, the content delivery entity 304 could steganographically encode into that media stream a watermark that is detectable and interpretable by the content presentation device to cause the content presentation device to carry out the associated action(s). The content presentation device 300 could thus detect that watermark in the media stream that the content presentation device is processing for presentation and, in response to the detected watermark, could carry out the associated action(s).

To facilitate this implementation, as further shown in FIG. 3, the content delivery entity 304 could include an abandonment-watermark encoder 314, and the content presentation device 300 could include an abandonment-watermark decoder 316. Each of these components could comprise software stored in data storage and executable by a processing unit and/or could take other forms.

In operation, the abandonment-watermark encoder 314 could function to encode an abandonment-watermark into a media stream that is being delivered to the content presentation device 300. And the abandonment-watermark decoder 316 could function to decode an abandonment-watermark from a media stream that the content presentation device 300 is receiving.

As is known in the art, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself, although inserting information in a packet header could be a viable alternative as well. Watermarking may permanently change the media content and be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psycho-acoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

In operation, to signal to the content presentation device 300 as noted above, the content delivery entity 304 could apply the abandonment-watermark encoder 314 to encode into the media stream being processed for presentation by the content presentation device 300 an abandonment-watermark that represents directly or by reference a directive for the content presentation device 300 to take particular action(s), such as to abandon a dynamic content modification and perhaps further to switch to processing a different specified media stream for presentation.

By way of example, the abandonment-watermark could be a watermark that encodes a predefined data value, or a value of a predefined format, that is interpretable by the content presentation device 300 to take the particular action(s). Thus, as the content presentation device 300 is receiving and processing the media stream, the content presentation device 300 could apply the abandonment-watermark decoder 316 to monitor the media stream for the presence of a watermark that encodes that particular data value.

The content presentation device 300 might start monitoring for presence of this abandonment-watermark once the content presentation device 300 starts planning for a dynamic content modification, such as once the content presentation device 300 receives from an ACR server or the like signaling related to an upcoming content-modification opportunity. And upon detecting in the media stream an abandonment-watermark that encodes the value interpretable by the content presentation device 300 to trigger abandonment of dynamic content modification, the content presentation device could responsively take the particular action(s), such as abandon the dynamic content modification and perhaps further switching to processing a different specified media stream for presentation.

In an example of this process, the content presentation device 300 might detect the abandonment-watermark between (i) the time when the content presentation device 300 receives from the ACR server 308 timing information and/or other information about an upcoming content-modification opportunity and (ii) the time when the upcoming content-modification opportunity would start. In that case, the content presentation device 300 could then respond to the detected abandonment-watermark by abandoning its plans to start the content modification and by thus not starting the content modification. For instance, here too, depending on where the content presentation device is in the planning process before starting the content modification, the content presentation device 300 might thereby forgo further operations such as working with a content management system and/or other entity to obtain details of the content modification to perform, and/or obtaining supplemental content such as replacement or overlay content.

Alternatively, the content presentation device 300 might detect the abandonment-watermark while the content presentation device 300 is currently rendering the content modification, such as while the content presentation device is rendering replacement or overlay content. In that case, the content presentation device 300 could then respond to the detected abandonment-watermark by discontinuing the content modification and thus reverting to rendering of the underlying media stream without completing the content modification.

Figure 4:
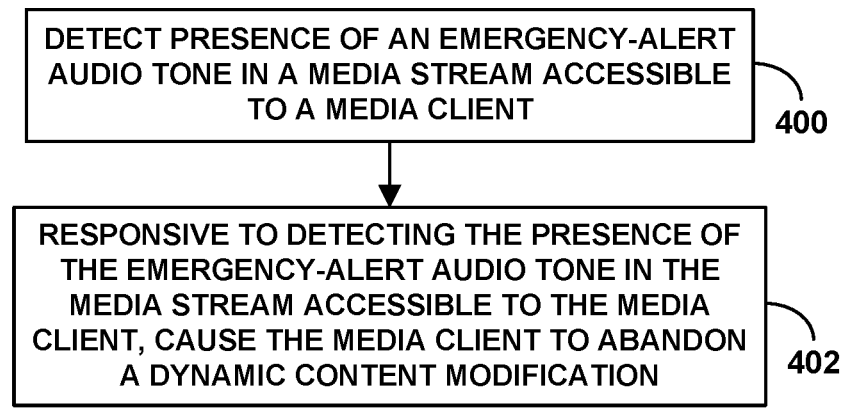
FIG. 4 is a flow chart depicting a method that could be carried out in accordance with the disclosure.

FIG. 4 is next a flow chart depicting a method that can be carried out in accordance with the present disclosure. As shown in FIG. 4, at block 400, the method includes detecting presence of an emergency-alert audio tone in a media stream accessible to a media client. And at block 402, the method includes, responsive to detecting the presence of the emergency-alert audio tone in the media stream accessible to the media client, causing the media client to abandon a dynamic content modification.

In line with the discussion above, this method could be carried out while the media client is processing the media stream for presentation, and with the dynamic content modification being a modification of content of the media stream.

Alternatively, the method could carried out while the media client is processing a first media stream for presentation and where the media stream accessible to the media client is a second media stream, and wherein the dynamic content modification is a modification of the first media stream. For instance, the first media stream being processed by the media client for presentation could be a television channel of a national broadcaster, and the second media stream could be a television channel of a local affiliate of the national broadcaster, local to a region of the media client. Further, the method could include, responsive to detecting the presence of the emergency-alert audio tone in the second media stream accessible to the media client, causing the media client to switch from processing the first media stream for presentation to instead processing the second media stream for presentation.

As further discussed above, the media client could include a television and/or a set top box, and the media stream could be a television channel. And as additionally discussed, the dynamic content modification could be triggered by a fingerprint-based ACR process such as by comparison of digital fingerprint data.

In an example implementation as discussed above, the method could be carried out at least in part by the media client. In that case, the act of causing the media client to abandon the dynamic content modification could involve the media client programmatically causing itself to abandon the dynamic content modification.

Alternatively or additionally, the method could be carried out at least in part by an entity that is in a path of distribution of the media stream to the media client, such as by an MVPD. And in this or other scenarios, the act of causing the media client to abandon a dynamic content modification could involve the entity signaling to the media client to cause the media client to abandon the dynamic modification. For instance, this could involve encoding into the media stream a watermark that is interpretable by the media client to cause the media client to abandon the dynamic content modification.

As further discussed above, the dynamic content modification could involve DAI. And detecting presence of the emergency-alert audio tone could involve detecting presence of a predefined emergency-alert audio tone, such as at least one predefined audio waveform indicative of an emergency alert for instance.

Yet further, as noted above, the method could be carried out between a time when the media client has received a directive to carry out the dynamic content modification and a time when the media client would start applying the dynamic content modification, and in which case abandoning the dynamic content modification could involve forgoing the dynamic content modification. Or the method could be carried out while the media client is applying the dynamic content modification, in which case abandoning the dynamic content modification could involve discontinuing the dynamic content modification.

FIG. 5 is next a simplified block diagram of an example system operable in accordance with the present disclosure. This system could represent a media client such as a content presentation device and/or an associated entity, or perhaps a content delivery entity, among other possibilities. As shown in FIG. 5, the example system includes a network communication interface 500, a processing unit 502, non-transitory data storage 504, any or all of which could be integrated together or, as shown, communicatively linked together by a system bus, network, or other connection mechanism 506.

The network communication interface 500 could comprise one or more physical network connection mechanisms to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication, and/or another interface suitable for carrying media, signaling, and/or other information.

The processing unit 502, could comprise one or more general purpose processors (e.g., microprocessors) and/or one or more specialized processors (e.g., application specific integrated circuits). And the non-transitory data storage 506 could comprise one or more volatile and/or non-volatile storage components, such as optical, magnetic, or flash storage.

As shown, the data storage 504 of the example system stores program instructions 508, which could be executable by processing unit 502 to carry out various operations described herein, such as those shown in FIG. 4 for instance.

Various features described above could be implemented in this context as well, and vice versa.

FIG. 6 is a simplified block diagram of an example media client operable in accordance with the present disclosure. In line with the discussion above, this media client could take various forms. For instance, it could be a television, computer monitor, set top box, streaming-media receiver, or other device that operates to receive and process video content for presentation, and/or it could be a loudspeaker, a pair of headphones, or other device that operates to receive and process audio content. Numerous other examples are possible as well.

As shown in FIG. 6, the example media client includes a content input interface 600, a content presentation interface 602, a network communication interface 604, a processing unit 606, and non-transitory data storage 608, any or all of which could be integrated together or, as shown, communicatively linked together by a system bus, network, or other connection mechanism 610.

The content input interface 600 could comprise a physical communication interface for receiving media content to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

The content presentation interface 602, which could be included if the media client operates to present the received media content, could comprise one or more components to facilitate presentation of the received media content. By way of example, the content presentation interface could comprise a user interface such as a display screen and/or a loudspeaker, as well as one or more drivers or other components for processing the received media content to facilitate presentation of the content on the user interface.

The network communication interface 604 could comprise a physical network connection mechanism to facilitate communication on a network, and/or for engaging in direct or networked communication with one or more other local or remote entities. As such, the network communication interface 604 could comprise a wireless or wired Ethernet interface or other type of network interface, for engaging in IP communication and/or other type of network communication.

The processing unit 606 could then comprise one or more general purpose processors (e.g., microprocessors) and/or one or more specialized processors (e.g., application specific integrated circuits). And the non-transitory data storage 608 could comprise one or more volatile and/or non-volatile storage components, such as optical, magnetic, or flash storage. Further, as shown, data storage 608 stores program instructions 612, which could be executable by processing unit 606 to carry out various operations described here.

Various features described above could be implemented in this context as well, and vice versa.

Further, the present disclosure also contemplates a non-transitory computer readable medium that is encoded with, stores, or otherwise embodies program instructions executable by a processing unit to carry out various operations as described herein.

Exemplary embodiments have been described above. Those skilled in the art will understand, however, that changes and modifications may be made to these embodiments without departing from the true scope and spirit of the invention.

What is claimed is:
1. A method comprising:
  determining presence of an upcoming dynamic content modification in an en-route media stream accessible to a media client;
  detecting presence of an emergency-alert audio tone in the en-route media stream; and responsive to detecting the presence of the emergency-alert audio tone in the en-route media stream, causing the media client to abandon the upcoming dynamic content modification prior to starting the upcoming dynamic content modification, wherein the detecting and the causing the media client to abandon the upcoming dynamic content modification are both carried out while the media client is processing the en-route media stream for presentation, and wherein the upcoming dynamic content modification is a modification of content of the en-route media stream.

2. The method of claim 1, wherein the media client comprises at least one entity selected from the group consisting of a television and a set top box, and wherein the en-route media stream is a television channel.

3. The method of claim 1, wherein the upcoming dynamic content modification is triggered by a comparison of digital fingerprint data.

4. The method of claim 1, wherein the method is carried out at least in part by the media client.

5. The method of claim 1, wherein the method is carried out at least in part by an entity that is in a path of distribution of the en-route media stream to the media client.

6. The method of claim 5, wherein the entity comprises a multichannel video program distributor.

7. The method of claim 5, wherein causing the media client to abandon the upcoming dynamic content modification further comprises encoding into the en-route media stream a watermark that is interpretable by the media client to cause the media client to abandon the upcoming dynamic content modification.

8. The method of claim 1, wherein the upcoming dynamic content modification comprises a dynamic advertisement insertion.

9. The method of claim 1, wherein the emergency-alert audio tone comprises at least one predefined audio waveform indicative of an emergency alert.

10. The method of claim 1, wherein the method is carried out between a time when the media client has received a directive to carry out the upcoming dynamic content modification and a time when the media client would start applying the dynamic content modification.

11. A system comprising:
a network communication interface;
a processing unit;
non-transitory data storage; and
program instructions stored in the non-transitory data storage and executable by the processing unit to carry out operations while a media client is processing a media stream for presentation, the operations including:

determining presence of an upcoming dynamic content modification in the media stream accessible to the media client;

detecting presence of an emergency-alert audio tone in the media stream; and responsive to detecting the presence of the emergency-alert audio tone in the media stream, causing the media client to abandon the upcoming dynamic content modification prior to starting the upcoming dynamic content modification, wherein the upcoming dynamic content modification is a modification of content of the media stream.

12. The system of claim 11, wherein the system is at an entity involved with delivery of the media stream to the media client.

13. A non-transitory computer-readable medium embodying program instructions executable to carry out operations while a media client is processing a media stream for presentation, the operations including:

determining presence of an upcoming dynamic content modification in the media stream accessible to the media client;

detecting presence of an emergency-alert audio tone in the media stream; and responsive to detecting the presence of the emergency-alert audio tone in the media stream, causing the media client to abandon the upcoming dynamic content modification prior to starting the upcoming dynamic content modification, wherein the upcoming dynamic content modification is a modification of content of the media stream.

14. The non-transitory computer-readable medium of claim 13, wherein the media client comprises at least one entity selected from the group consisting of a television and a set top box, and wherein the media stream is a television channel.

15. The non-transitory computer-readable medium of claim 13, wherein the upcoming dynamic content modification is triggered by a comparison of digital fingerprint data.

16. The non-transitory computer-readable medium of claim 13, wherein causing the media client to abandon the upcoming dynamic content modification comprises encoding into the media stream a watermark that is interpretable by the media client to cause the media client to abandon the upcoming dynamic content modification.

17. The non-transitory computer-readable medium of claim 13, wherein the upcoming dynamic content modification comprises a dynamic advertisement insertion.

* * * * *